(12) United States Patent
Tulett et al.

(10) Patent No.: US 9,217,797 B2
(45) Date of Patent: Dec. 22, 2015

(54) HIGH-SPEED IMAGE MONITORING OF BASEPLATE MOVEMENT IN A VIBRATOR

(71) Applicant: Schlumberger Technology Corporation, Sugar Land, TX (US)

(72) Inventors: John Richard Tulett, Yokohama (JP); Theodorus Tjhang, Sagamihara (JP); Emmanuel Coste, Houston, TX (US); Halvor Sehested Groenaas, Asker (NO); Timothy James Dean, Winchester (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 79 days.

(21) Appl. No.: 13/860,540

(22) Filed: Apr. 11, 2013

(65) Prior Publication Data

US 2014/0305732 A1    Oct. 16, 2014

(51) Int. Cl.
*G01V 1/38*     (2006.01)
*G01V 1/135*    (2006.01)
*G01V 1/047*    (2006.01)
*G01H 9/00*     (2006.01)

(52) U.S. Cl.
CPC ............. *G01V 1/135* (2013.01); *G01V 1/0475* (2013.01); *G01H 9/00* (2013.01)

(58) Field of Classification Search
CPC ......... G01H 9/00; G01V 1/003; G01V 1/005; G01V 1/02; G01V 1/364; G01V 2210/12
USPC .......................... 356/614; 181/108, 113, 121; 250/227.14; 367/38, 41, 45, 46, 189
See application file for complete search history.

(56) References Cited

U.S. PATENT DOCUMENTS

| 4,930,113 | A | * | 5/1990 | Sallas ........................... 367/190 |
| 5,703,833 | A | * | 12/1997 | Allen ............................. 367/46 |
| 6,381,544 | B1 | * | 4/2002 | Sallas et al. .................... 702/17 |
| 6,754,590 | B1 | * | 6/2004 | Moldoveanu ................... 702/14 |

(Continued)

FOREIGN PATENT DOCUMENTS

WO    2013/022866    2/2013

OTHER PUBLICATIONS

International search report and written opinion for the equivalent PCT patent application No. PCT/US2014/033795 issued on Aug. 1, 2014.

(Continued)

*Primary Examiner* — Sang Nguyen
(74) *Attorney, Agent, or Firm* — Daryl R. Wright; Jody DeStefanis

(57) ABSTRACT

Systems, sensors, and methods for high-speed image monitoring of baseplate movement in a vibrator. The systems can include a baseplate defined by an area, disposable at a ground surface to direct a seismic force into the ground surface. The system can include a reaction mass coupled to and positioned above the baseplate to generate the seismic force at the baseplate. The system can include an actuator assembly coupled to the reaction mass to vibrate the reaction mass, as well as high-speed image units directed at the area of the baseplate. The high-speed image units can include photo detectors to sense a distribution of acceleration across the area of the baseplate, and a light source emit light to be sensed by the photo detectors. The system can also include a controller coupled to the actuator assembly, that drives the actuator assembly.

20 Claims, 14 Drawing Sheets

(56) References Cited

U.S. PATENT DOCUMENTS

| | | | |
|---|---|---|---|
| 7,872,949 B2* | 1/2011 | Osawa | 367/189 |
| 7,945,873 B2 | 5/2011 | Watanabe et al. | |
| 8,797,828 B1* | 8/2014 | Lev et al. | 367/64 |
| 2002/0149998 A1 | 10/2002 | Hoover | |
| 2006/0250891 A1* | 11/2006 | Krohn | 367/38 |
| 2007/0240930 A1 | 10/2007 | Wei et al. | |
| 2008/0205191 A1 | 8/2008 | Coste et al. | |
| 2010/0276224 A1 | 11/2010 | Wei | |
| 2011/0198147 A1* | 8/2011 | Eick et al. | 181/113 |
| 2011/0198148 A1 | 8/2011 | Eick et al. | |
| 2012/0037445 A1 | 2/2012 | Eick et al. | |
| 2012/0076364 A1 | 3/2012 | Tjhang et al. | |
| 2012/0271551 A1 | 10/2012 | Wei et al. | |
| 2014/0151147 A1* | 6/2014 | Lupton et al. | 181/108 |

OTHER PUBLICATIONS

M. Ishikawa et al., "A CMOS Vision Chip with SIMD Processing Element Array for 1 millisecond (ms) Image Processing", IEEE International Solid-State Circuits Conference (ISSCC 1999), Dig. Tech. Papers, pp. 206-207, 1999.

J. J., Sallas, "Seismic vibrator control and the downgoing P-wave," Geophysics, 49, 1984, pp. 732-740.

Y. Watanabe, et al, "955-fps Real-time Shape Measurement of a Moving/Deforming Object using High-speed Vision for Numerous-point Analysis", 2007 IEEE International Conference on Robotics and Automation Roma, Italy, Apr. 10-14, 2007.

C. Bagaini, et al, "Land Seismic Techniques for High-Quality Data", Oilfield Review, summer 2010.

\* cited by examiner

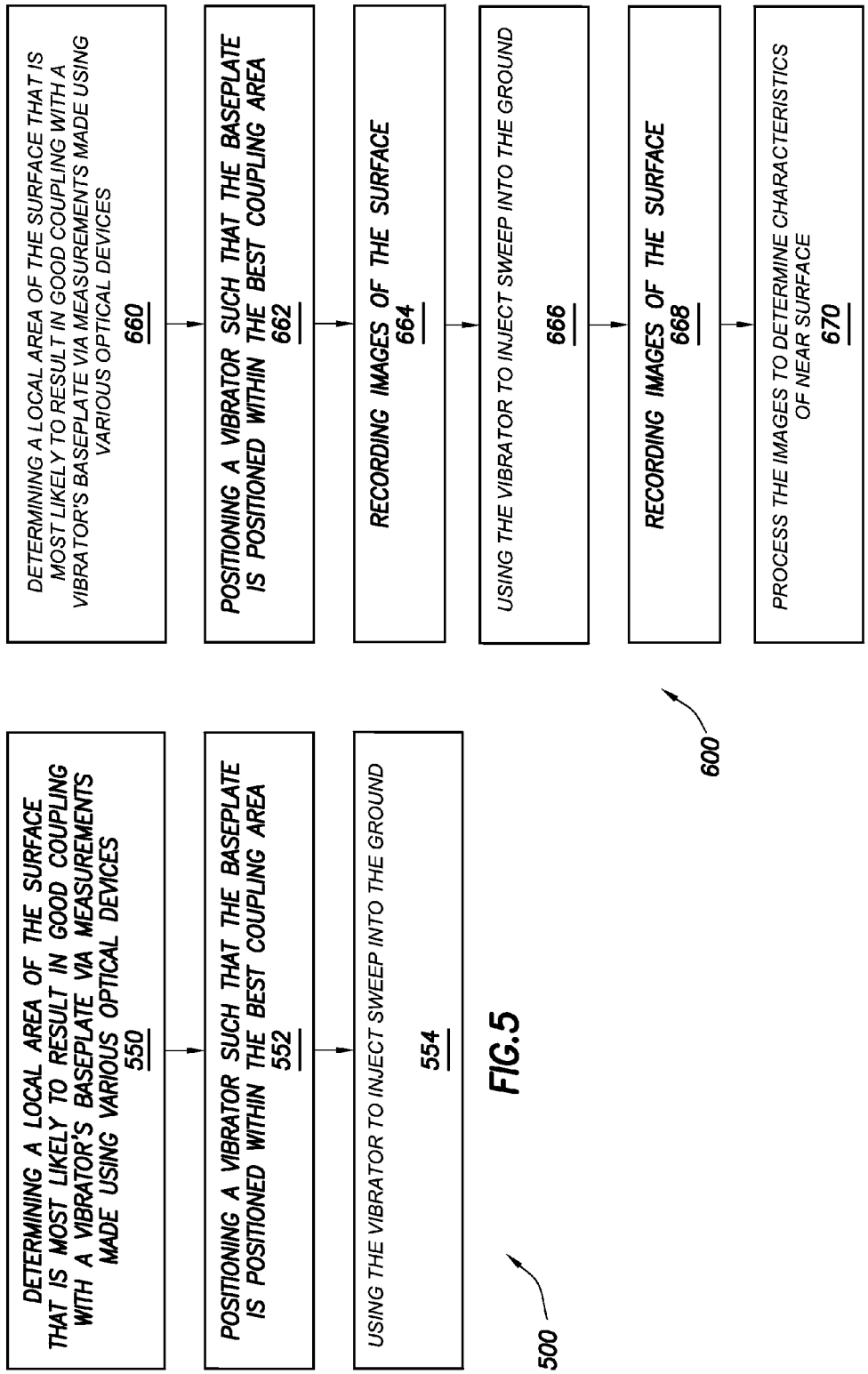

HIGH-SPEED IMAGE MONITORING OF BASEPLATE MOVEMENT IN A VIBRATOR

BACKGROUND

The present disclosure relates to seismic exploration. More specifically, the present disclosure relates to sensors and methods for high-speed (i.e., real-time) imaging-based monitoring in seismic vibrators.

In the oil and gas industry, geophysical prospecting techniques are commonly used to aid in the search for and evaluation of subterranean hydrocarbon deposits. Generally, a seismic energy source is used to generate a seismic signal that propagates into the earth and is at least partially reflected by subsurface seismic reflectors (e.g., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

In one type of geophysical prospecting, hydraulic seismic vibrators may be used in onshore seismic acquisition surveys often referred to as a VIBROSEIS™ survey. Hydraulic seismic vibrators transmit to the earth's interior a signal for which quality may be partially dependent on the quality of the coupling between components of the vibrator and the earth, as well as characteristics of the signal (e.g., sweep) imparted to the earth. A vibrator may be described as an adjustable mechanical source that delivers vibratory seismic energy to the earth for acquisition of seismic data. Vibrators are often mounted to large trucks, the weight of which contributes to maintaining a consistent coupling between the vibrators and the earth.

When a vibrator transmits energy to the earth, the degree to which the earth approximates a spring depends on the amount of coupling between components of the vibrator (e.g., the baseplate) and the earth on which it rests. As the "springiness" of the ground changes, even with near or at surface conditions, the frequency-response of the coupling may change.

Various apparatuses and methods for seismic vibrator surveying are provided in US Publication Nos. 2010/0276224, 2012/0271551.

SUMMARY

In at least one aspect, the disclosure relates to a system for high-speed image monitoring of baseplate movement in a vibrator. The system can include a baseplate defined by an area, disposable at a ground surface configured to direct a seismic force into the ground surface. The system can include a reaction mass coupled to and positioned above the baseplate to generate the seismic force at the baseplate. The system can include an actuator assembly (e.g., valve and piston) coupled to the reaction mass to vibrate the reaction mass. The system can include high-speed image units directed at the area of the baseplate. The high-speed image units can include photo detectors to sense a distribution of acceleration across the area of the baseplate, and a light source to emit light to be sensed by the photo detectors. The system can also include a controller coupled to the actuator assembly. The controller serves to drive the actuator assembly.

In at least one aspect, the disclosure relates to a sensor for high-speed image monitoring of baseplate movement in a vibrator. The sensor can include a light source disposable on a seismic land vibrator to emit light. The sensor can include photo detectors disposed above an area of a baseplate of the seismic land vibrator. The photo detectors can measure light emitted by the light source. The sensor can include a high-speed image processor coupled to the photo detectors to measure a distribution of acceleration across the area of the baseplate based on the measured light detected by the photo detectors.

In at least one aspect, the disclosure relates to a method for high-speed image monitoring of baseplate movement in a vibrator. The method can include positioning a seismic vibrator in a survey area. The seismic vibrator can include: a baseplate defined by an area, disposable at a ground surface to direct a seismic force into the ground surface; a reaction mass coupled to and positioned above the baseplate to generate the seismic force at the baseplate; an actuator assembly coupled to the reaction mass to vibrate the reaction mass; high-speed image units directed at the area of the baseplate. The high-speed image units can include photo detectors to sense a distribution of acceleration across the area of the baseplate, and a light source to emit light to be sensed by the photo detectors. The seismic vibrator can also include a controller coupled to the actuator assembly, the controller to drive the actuator assembly. The method can further include emitting light from the light source. The method can further include sensing a distribution of acceleration across the area of the baseplate.

In at least one aspect, the disclosure relates to a survey method. The method can include positioning a seismic vibrator in a survey area. The seismic vibrator can include: a baseplate defined by an area, disposable at a ground surface to direct a seismic force into the ground surface; a reaction mass coupled to and positioned above the baseplate to generate the seismic force at the baseplate; an actuator assembly coupled to the reaction mass to vibrate the reaction mass; high-speed image units directed at the area of the baseplate. The high-speed image units can include photo detectors to sense a distribution of acceleration across the area of the baseplate, and a light source to emit light to be sensed by the photo detectors. The seismic vibrator can also include a controller coupled to the actuator assembly. The controller can drive the actuator assembly. The method can further include obtaining a plurality of measurements indicative of seismic vibrator baseplate-earth coupling in the survey area. The method can further include determining an optimal coupling location based on the plurality of measurements indicative of seismic vibrator baseplate-earth coupling in the survey area. The method can further include positioning the seismic vibrator in the optimal coupling location. The method can further include applying a seismic sweep into the survey area using the seismic vibrator.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of systems, apparatuses, and methods for high-speed image monitoring of baseplate movement in a vibrator are described with reference to the following figures. Like numbers are used throughout the figures to reference like features and components.

FIG. 1-2 is a block diagram of a high-speed image of baseplate-earth coupling vibrator control system, in an embodiment of the present disclosure.

FIG. 1-3 is a block diagram of a high-speed image of baseplate-earth coupling vibrator system, in an embodiment of the present disclosure.

FIG. 1-4 is a block diagram of a high-speed image of baseplate-earth coupling vibrator system including a vibration absorption unit, in an embodiment of the present disclosure.

FIG. 1-5 is a block diagram of a high-speed image of baseplate-earth coupling vibrator system as could be employed in the system of FIG. 1-1, in an embodiment of the present disclosure.

FIG. 2 is a schematic of a high-speed image apparatus used in the systems of FIGS. 1-1, 1-2 and 1-3, in an embodiment of the present disclosure.

FIG. 3-1 is an example imaging processor that may be used to implement the high-speed image unit in FIG. 1-1, 1-2, 1-3, or 2.

FIG. 3-2 is a block diagram of a high-speed imaging system including a multi-spot projector, in an embodiment of the present disclosure.

FIG. 3-3 is a block diagram of a high-speed imaging system including a multi-spot projector, in an embodiment of the present disclosure.

FIG. 4 is a flowchart of a method for high-speed, image-based baseplate-earth coupling monitoring in a vibrator, in an embodiment of the present disclosure.

FIG. 5 is a flowchart of a method for automated positioning of a vibrator baseplate by processing of an optical image, in an embodiment of the present disclosure.

FIG. 6 is a flowchart of a method for image recording and vibrator positioning for processing, in an embodiment of the present disclosure.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

A high-speed image processing system and method can be applied to measure acceleration distribution on a vibrator baseplate, which may be indicative of a quality of coupling between the baseplate and the ground. The acceleration distribution may be used to increase amplitude of the force applied to the ground by the vibrator and to reduce harmonics and noise. The high-speed image processing based observation of baseplate movement and flexing may be fed into the vibrator control system to tailor the fidelity of the force applied to the ground. Additionally, high speed imaging units may be added to visually monitor the coupling of the baseplate with the ground, and the output of the high-speed imaging unit(s) may enable further tailoring of the force imparted to the ground.

Figure 1:
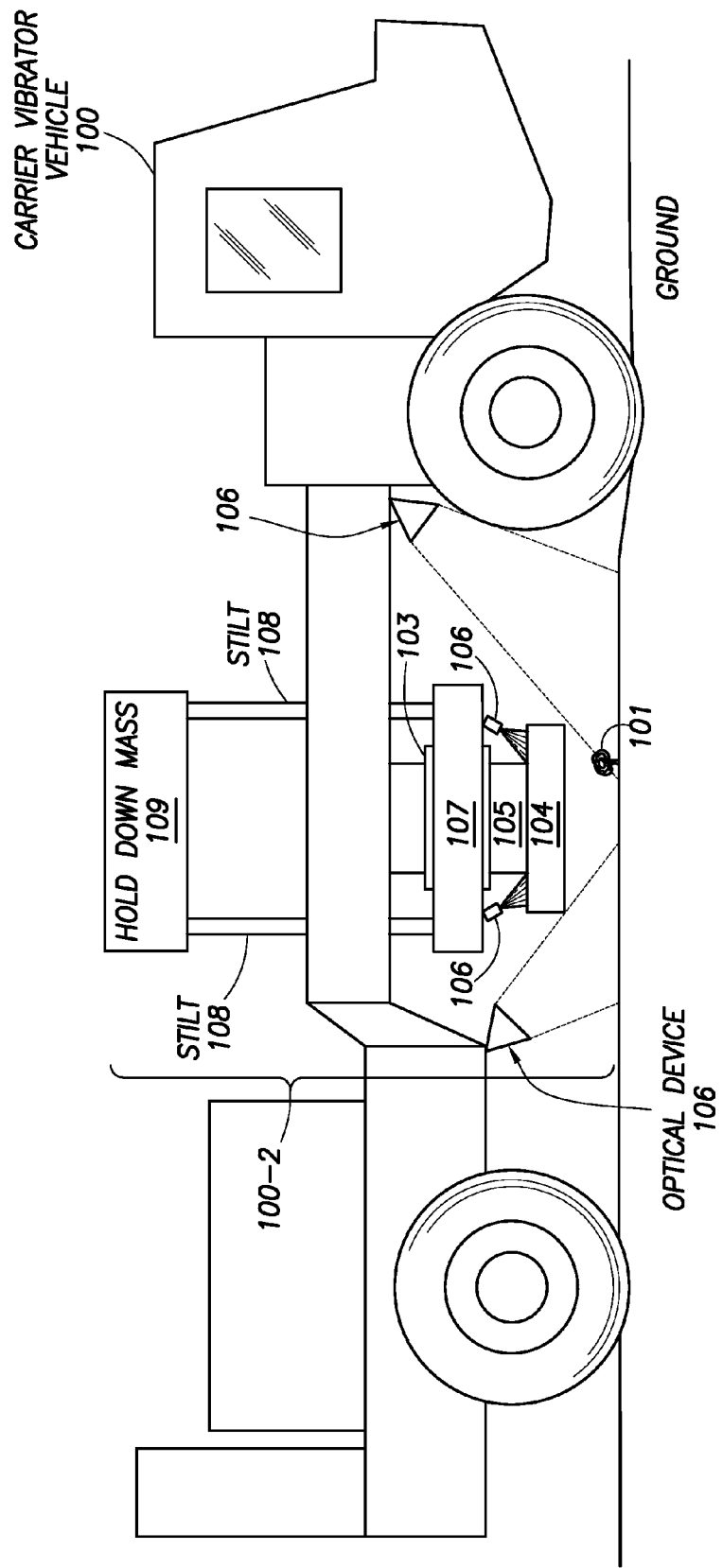
FIG. 1-1 is a schematic of a high-speed image of baseplate-earth coupling vibrator system mounted to a vehicle, in an embodiment of the present disclosure.

To impart acoustic energy for a land seismic survey, a seismic source can be a vibrator 100-2. An example of such vibrator can be a VIBROSEIS™ truck. FIG. 1-1 is a schematic of a high-speed image of baseplate-earth coupling vibrator 100-2 system mounted to a carrier vibrator vehicle 100, in an embodiment of the present disclosure. As shown, the vibrator 100-2 may be mounted on a carrier vibrator vehicle 100, as shown generally in FIG. 1, that lowers the vibrator 100-2 to the ground during a survey. With the vibrator 100-2 lowered, the weight of the carrier vibrator vehicle 100 maintains the baseplate 104 engaged with the ground so seismic source signals (e.g., sweeps) can be transmitted into the ground. In an embodiment, a single high-speed imaging unit (e.g., high-speed camera) may be mounted to the undercarriage of the vibrator. In an embodiment, a plurality of high-speed imaging units (e.g., high-speed cameras) may be mounted to the undercarriage of the carrier vibrator vehicle 100. In an embodiment, the high-speed imaging unit(s) may be oriented such that the area sensed is the area under or about the baseplate 104. In an embodiment, one or more of the high-speed imaging units may be oriented such that the user (e.g., driver of the vibrator truck) may adjust the position of the baseplate 104 to enable improved coupling, with relatively small changes in position. In an example embodiment, a distance separating an area of flat sand (and therefore good coupling) and a rise 101 in the ground surface caused by a small bush, rock or minor outcropping, for example, (and therefore an area of poor coupling) may be roughly 1 meter (m).

Other reasons for baseplate flexing that could result in poor coupling may include design features (e.g., the baseplate lacks stiffness), mechanical conditions (e.g., baseplate has cracked or has loose fasteners), and excessive drive level. Upon detection of any of these causes for baseplate flexing, the imaging system could be used to advise the operator to inspect, replace, or reposition the baseplate to achieve a more effective coupling.

Figures 1, 2:
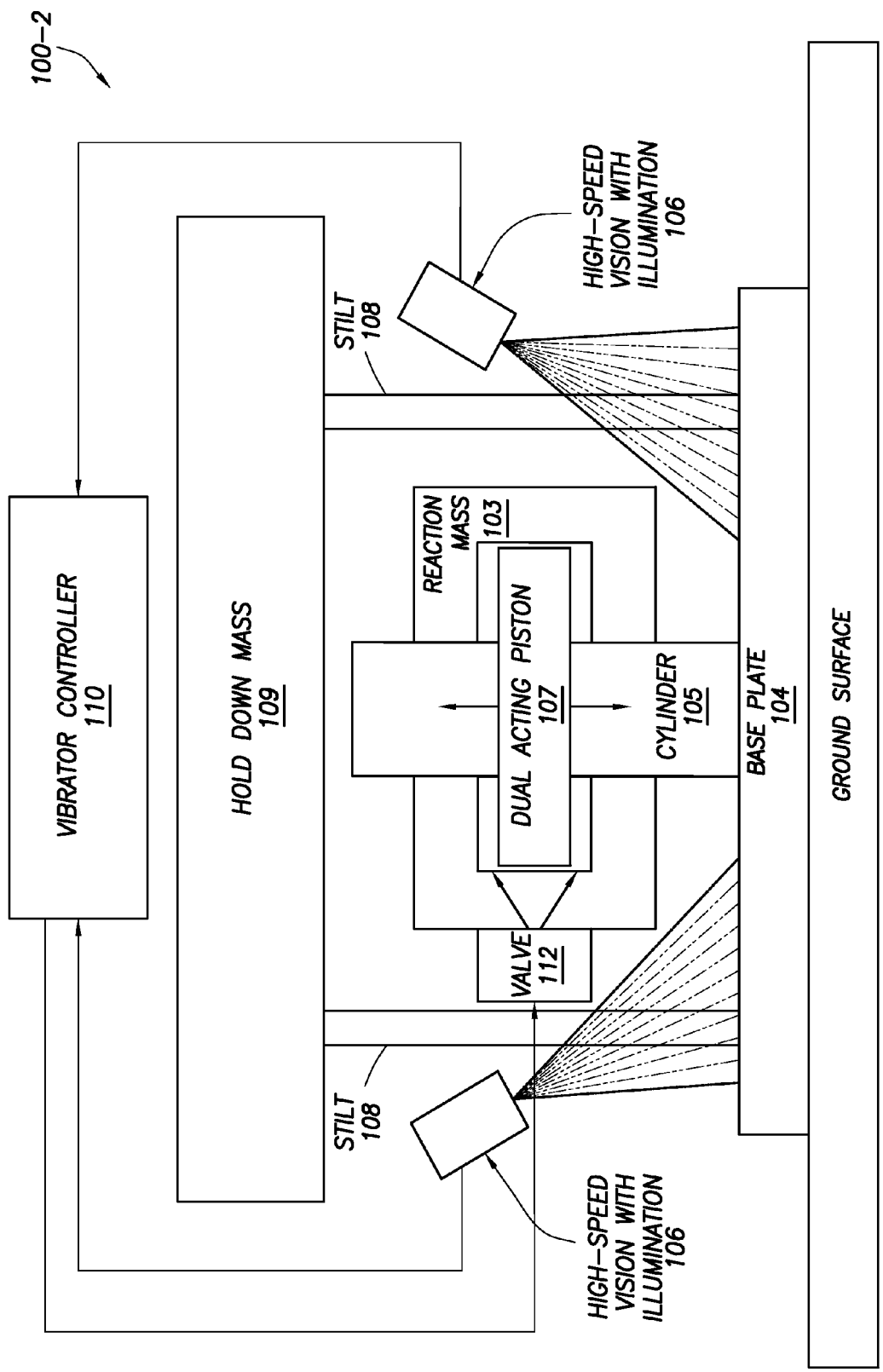

FIG. 1-2 is a zoomed in block diagram representing a high-speed image of baseplate-earth coupling vibrator control system, in an embodiment of the present disclosure, which may be employed in the system shown in FIG. 1-1. Turning to FIG. 1-2, the vibrator 100-2 transmits force to the ground via a baseplate 104 and a reaction mass 103. The reaction mass 103 is positioned directly above baseplate 104 and stilts 108 extending from the baseplate 104 and about the reaction mass 103 for stabilization. The reaction mass 103 acts upon the baseplate 104 to impart a seismic source signal into the ground, the signal travels through the ground, reflects at discontinuities and formations, and then travels toward the ground's surface. Internally, the reaction mass 103 has a cylinder 105 therethrough, and a vertically extending dual acting piston 107 extends through cylinder 105. A hold down mass 109 is supported by the stilts 108 that contributes to maintaining the baseplate 104 coupling in place when vibrator 100-2 is lowered to ground.

A vibrator controller 110 can be provided to drive and operate the vibrator 100-2. During operation, the vibrator controller 110 receives signals from high-speed image units 106, described further below, that measure acceleration distribution across the surface of the baseplate 104. Based on feedback from the high-speed image units 106, the vibrator controller 110 generates a drive signal to a valve 112 coupled to the dual acting piston 107. Driven by the drive signal, the valve 112 routes hydraulic fluid between a hydraulic fluid supply (not shown) and the dual acting piston 107. The reaction mass 103 reciprocally vibrates on the dual acting piston 107. In turn, the force generated by the vibrating reaction mass 103 transfers to the baseplate 104 via the dual acting piston 107 and cylinder 105 so that the baseplate 104 vibrates at a desired amplitude and frequency or sweep to generate a seismic source signal into the ground.

Observing the flexing of the baseplate 104 can provide information about the coupling between the baseplate 104 and the ground. The coupling information can be used to increase the amplitude of the force applied to the ground by the vibrator 100-2, and to reduce harmonics and noise. Measurements pertaining to base plate flexing can provide feedback information to the vibrator controller 110 to further improve the fidelity of the force applied to the ground.

As noted above, one or more high-speed image units 106 may be provided; each coupled to the vibrator controller 110, and disposed so as to measure a distribution of acceleration across the baseplate 104. For example, as shown in FIGS. 1-1 and 1-2, at least two high-speed image units 106 may be provided to obtain an indication of acceleration of the baseplate 104 in at least two locations.

Figures 1, 2, 3:
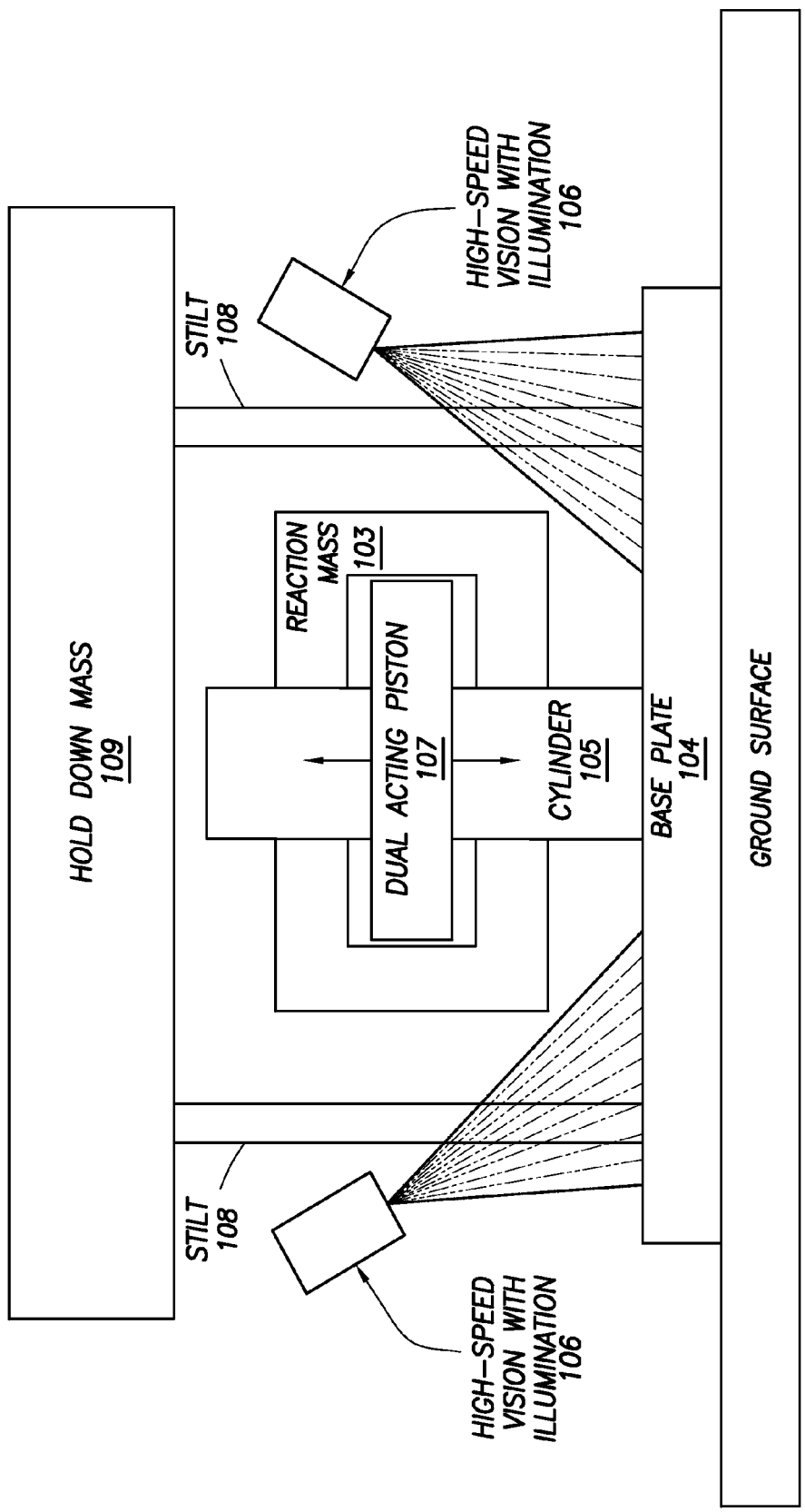

FIG. 1-3 is a block diagram of a high-speed image of baseplate-earth coupling vibrator system, in an embodiment of the present disclosure. As noted above, the base plate 104 couples to the ground. The base plate 104 is coupled to reaction mass 103 via the cylinder 105 and dual acting piston 107. The hold down mass 109 is supported by stilts 108 that couple the hold down mass 109 to the baseplate 104. The one or more high-speed image units 106 may be positioned above the base plate 104, directly or at an angle, so as to direct light at the base plate 104 and sense light that has come into contact with the base plate 104, as well as direct light at the ground and sense light that has come into contact with the ground. In an embodiment, the high-speed image units 106 could be mounted directly to the hold down mass 109, or a housing unit about the vibrator 100-2, or on the stilts 108, etc.

FIG. 1-4 is a block diagram of a high-speed image of baseplate-earth coupling vibrator system including a vibration absorption unit, in an embodiment of the present disclosure. A vibration absorption unit may be optionally added to the system of FIG. 1-3, as shown in the block diagram of FIG. 1-4. A vibration absorption unit 115 may be provided between the vibrator carrier vehicle 100 and the high-speed imaging system 106. The vibration absorption unit 115 may include any one or more of the following: vibration damping material (passive), air vibration damping apparatus (active: by controlling the air pressure to cancel the vibration) and any other suitable active vibration cancelling system, etc.

FIG. 1-5 is a block diagram of a high-speed image of baseplate-earth coupling vibrator system as could be employed in the system of FIG. 1-1, in an embodiment of the present disclosure. Using high-speed imaging system 106, it is possible to measure, over time, the ground z-axis displacement z(t) (average of points' distance) in area of observation. Assuming the ground is rigid (no change over time), any variation dz(t) in z-axis displacement variation measured over time is due to the vibration of the vibrator carrier vehicle 100 itself. The vibrator carrier vehicle 100's vibration dz(t) (reference to ground) can be used to compensate the baseplate 104 flexing measurement to overcome the vibration effect for example, used as the feedback signal to control the vibration absorption unit 115 of FIG. 1-4. Also, dz(t) can also be used directly on the baseplate 104 flexing measurement computation to compensate the vibration of the vibrator carrier vehicle 100.

FIG. 2 is a schematic of a high-speed image apparatus 200 (which can be used as the high-speed image units 106 in the systems of FIG. 1-1, 1-2 or 1-3), in an embodiment of the present disclosure. An example high-speed image apparatus is shown and described in detail in U.S. Publication 2012/0076364, which is commonly assigned and hereby incorporated by reference in its entirety. In a high-speed image apparatus, an imaging processor 221 samples light that has contacted a target (in this case, the vibrator baseplate 104) and processes the light in real-time. The high-speed image apparatus 200 may include a light source 220. In an embodiment, the light source is a laser diode. In an embodiment, the light source may be a multi-spot pattern projection light source for measuring a z-axis distance in three dimensions (discussed further with respect to FIG. 3-2). The light off the baseplate 104 may be detected in an image plane 222 at the imaging processor 221 and processed into shape information 223 pertaining to acceleration, as will be discussed further below. In an embodiment, a white light source (such as an LED or a lamp, etc.) may be used to provide background illumination to increase the intensity of an image obtained in a dark environment.

FIG. 3-1 illustrates a schematic for an example implementation 300 of the imaging processor 221 described above. In the example of FIG. 3-1, the imaging processor 221 includes an array of pixel sensors 330. Each example pixel sensor 330 of the imaging processor 221 includes a respective example photo detector (PD) 332 and an associated example of a processing element (PE) 334. Each PD 332 of the illustrated example determines image data (e.g., such as position, texture, distance, intensity, color, etc.) for a respective portion (e.g., such as a respective pixel) of an image region supported by the imaging processor 221 as defined by the array of pixel sensors 330. As such, the size of the array of pixel sensors 330 determines the image resolution that can be obtained by the imaging processor 221, based on the position (distance) for each time sample. For example, the array of pixel sensors 330 can be dimensioned to include X rows by Y columns of sensors, where X and Y are chosen to provide a desired image resolution. Example of (X, Y) dimensions for the array of pixel sensors 330 include, but are not limited to, (100, 100), (600, 400), (800, 600) (1024, 768), etc., or any other appropriate pair of dimensions.

In the illustrated example, each PE 334 for each pixel sensor 330 of the imaging processor 221 includes an arithmetic and logic unit (ALU) and an internal memory. Additionally, the PE 334 in one cell is connected to and can communicate with other PEs 334 (referred to herein as neighbor PEs 334) in one or more (e.g., such as 4) adjacent, neighbor pixel sensors 330. In some examples, each PE 334 is able to perform arithmetic and logical operations on the image data obtained from the PD 332 in its own pixel sensor 330 and the image data obtained from other PDs 332 (referred to herein as neighbor PDs) in one or more (e.g., such as 4) adjacent, neighbor cells. In such examples, the PE 334 can be connected to and communicate with its own memory (e.g., which stores the image data from the PD 332 in its own cell) and the memories of neighbor PEs 334 (e.g., which store the image data from neighbor PDs).

In the illustrated example, each PE 334 for each pixel sensor 330 is programmable by an imaging processor controller via any appropriate example decoder circuitry. For example, the imaging processor controller can use the decoder circuitry to send machine-readable instructions to one or more, or all, of the PEs 334. In some examples, the PEs 334 of the imaging processor 221 support parallel processing of the image data in their respective memories and neighbor memories, and the instructions can be single instruction multiple data (SIMD) instructions supporting such parallel processing. In the illustrated example, the processed image data resulting from the processing (e.g., parallel processing) performed by the PEs 334 can be read by or otherwise returned to the imaging processor controller via any appropriate example output circuitry. Further examples of high-speed imaging technologies that can be used to implement the imaging processor 221 are described in Masatoshi Ishikawa et al., "A CMOS Vision Chip with SIMD Processing Element Array for 1 millisecond (ms) Image Processing", IEEE International Solid-State Circuits Conference (ISSCC 1999), Dig. Tech. Papers, pp. 206-207, 1999, which is incorporated herein by reference in its entirety.

In an example operation of the imaging processor 221 and imaging processor controller of FIG. 3-1, the imaging processor controller uses the decoder circuitry to program the PEs 334 of the pixel sensors 330 to cause the PDs 332 of the pixel sensors 330 to sense light that has contacted the baseplate 104. Each PD 332 processes the sensed light to determine image data, such as image position, texture, distance, intensity, color, etc., for its respective portion of the image region supported by the imaging processor 221. The image data determined by a particular PD 332 is stored in the memory of the respective PE 334 included in the same pixel sensor 330.

The imaging processor controller then uses the decoder circuitry to program each PE 334 for each pixel sensor 330 to process the image data stored in its memory (e.g., corresponding to the image data obtained from its associated PD 332) and the image data stored in the memories of the neighbor PEs 334 (e.g., corresponding to the image data obtained from neighbor PDs) to determine acceleration information for the baseplate 104. That is, position measurements can be used to derive velocity (distance over time) as well as acceleration (velocity over time).

After the PEs 334 determine the acceleration information by processing the image data for their respective neighborhoods, the imaging processor controller uses the output circuitry to read this acceleration information. The imaging processor controller can then process the acceleration information to determine a distribution of acceleration across the baseplate 104. For example, imaging processor controller can use any appropriate image processing technique or techniques to process the acceleration information to determine the flexing in the image region (e.g., on the baseplate 104) supported by the imaging processor 221.

With a conventional vibrator control system, the baseplate acceleration is measured at one point, the point where the analog acceleration sensor is physically fixed to the top surface of the baseplate. Because the baseplate acceleration is measured at one point in a conventional control system, other areas of the baseplate could be flex undetected, leading to the undesirable effect of decoupling of the baseplate with the ground surface. By comparison, the imaging systems disclosed herein derive multiple accelerations of the baseplate 104 over the large area of the baseplate illuminated by high-speed image units 106. By analyzing differences in the baseplate movement across the surface of the baseplate area in more than one point, the degree of flexing in the baseplate can be determined.

In a conventional imaging system, the force output by a vibrator, the ground-force ($F_g$), can be estimated using the weighted-sum of two accelerometers, one each attached to the baseplate and the reaction mass of the vibrator. The accelerometer sensors used in a conventional system convert mechanical motion (acceleration) to an analog electrical signal to be processed by the vibrator controller:

$$F_g = m_{rm} a_{rm} + m_{bp} a_{bp} \qquad \text{eq. 1}$$

where $m_{rm}$ and $m_{bp}$ are the respective masses of the reaction mass and the baseplate, and $a_{rm}$ and $a_{bp}$ are their respective accelerations. (See, e.g., Sallas, J. J. [1984] Seismic vibrator control and the downgoing P-wave, Geophysics, 49, 732-740.)

As mentioned above, with a conventional vibrator control system, the baseplate acceleration is measured at a single point, the point where the analog accelerometer sensor is physically fixed on the top surface of the baseplate. Because the baseplate acceleration is measured at a single point in a conventional control system, the estimate of the ground-force signal could be compromised.

FIG. 3-2 shows a high-speed imaging system including a multi-spot projector, in an embodiment of the present disclosure. As shown, a background light source 333 may comprise an LED, a halogen lamp or any suitable illumination coupled to the processor 221, and having a focus adjustable lens 331 positioned between the processor 221 and a background light source 333. Also provided is a multispot pattern laser projector to provide the focused light source 220. Examples of such multisport pattern laser projectors can be found at http://www.opto-engineering.com/led-pattern-projectors.html. The multispot pattern laser projector used as the focused light source 220 may be used to generate multispot projection on the target surface (e.g., the baseplate or the ground) and used for z-axis distance measurement when there is no need for 2D information such as color, texture or 2D-shape. In an embodiment, the focus adjustable lens 331 may be controlled so that the image captured by high-speed imaging system is on the focal-plane, producing a sharp image.

FIG. 3-3 is a block diagram of a high-speed imaging system including a multi-spot projector as the focused light source 220 showing the various images obtained and the resulting calculations, which may be based upon the images. Based on the following equation:

$$a = \frac{\partial^2 (z)}{(\partial t)^2} \qquad \text{eq. 2}$$

representing acceleration as a second derivation of distance z, the system may first measure a z-axis distance using a combination of multi-spot projector and high-speed imaging system. From the detected z-axis distance za, zb, zc and so on, acceleration on each points A (baseplate in position A), B (baseplate in position B), C (baseplate to ground) can be derived using this equation.

In any of the above embodiments, optional accelerometers (not shown) may be included in addition to the high-speed imaging system to measure movement of the area of the baseplate and supplement the methods described herein.

Figures 1, 2, 3, 4:
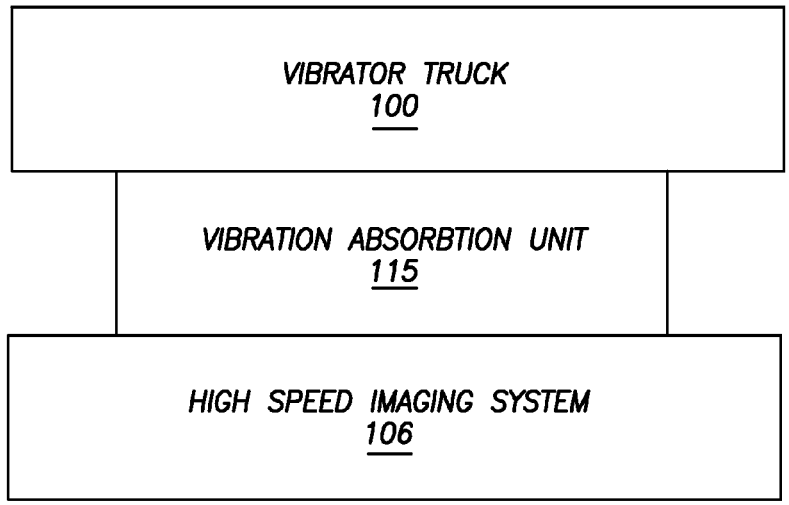

FIG. 4 is a flowchart of a method 400 for high-speed image-based baseplate-earth coupling monitoring in a vibrator in an embodiment of the present disclosure. The method 400 begins with positioning 430 a seismic vibrator 100-2, such as that disclosed above, in a survey area. This may include positioning 430 a seismic vibrator carrier vehicle 100 in a survey area, and lowering the baseplate 104 of the vibrator 100-2 to couple to the ground.

The method 400 proceeds with emitting 432 light from a light source 220 of at least one high-speed image apparatus 200. The method 400 proceeds with sensing 434 a distribution of acceleration (based on a plurality of measurements at a plurality of points) across a baseplate 104 (according to, for example, a processing method as described herein with respect to FIG. 8) with the high-speed image apparatus 200. The method proceeds with deriving 436 a total acceleration of the baseplate 104 based on the distribution of acceleration over the plurality of measurement points. The method 400 proceeds with providing 438 a feedback signal from high-speed image unit(s) 106 to vibrator controller 110 based on the distribution of acceleration across the baseplate 104. The method 400 proceeds with driving 440 a valve 112 and dual acting piston 107 assembly based on the feedback signal, thereby tailoring the force imparted in each subsequent sweep to the coupling between the baseplate 104 and the ground at a particular location.

Figures 1, 2, 3, 4, 5:
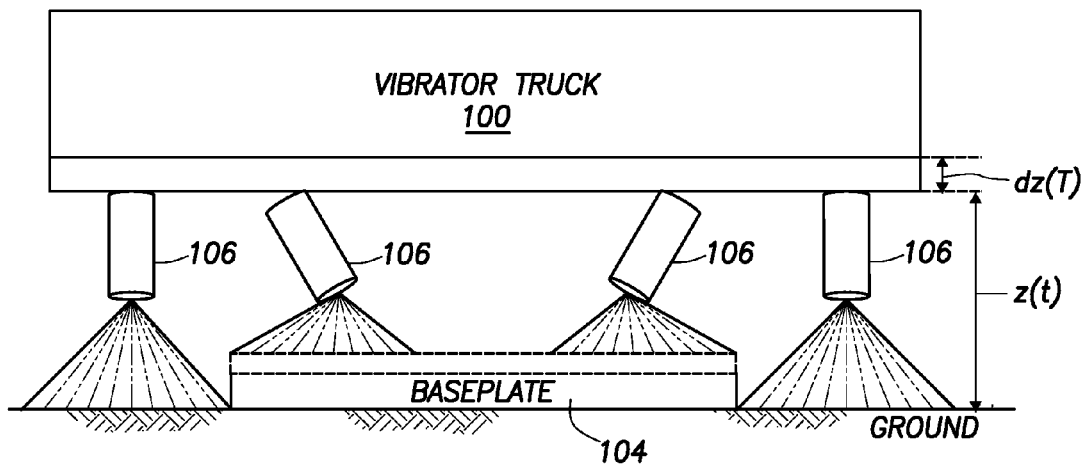
Figure 2:
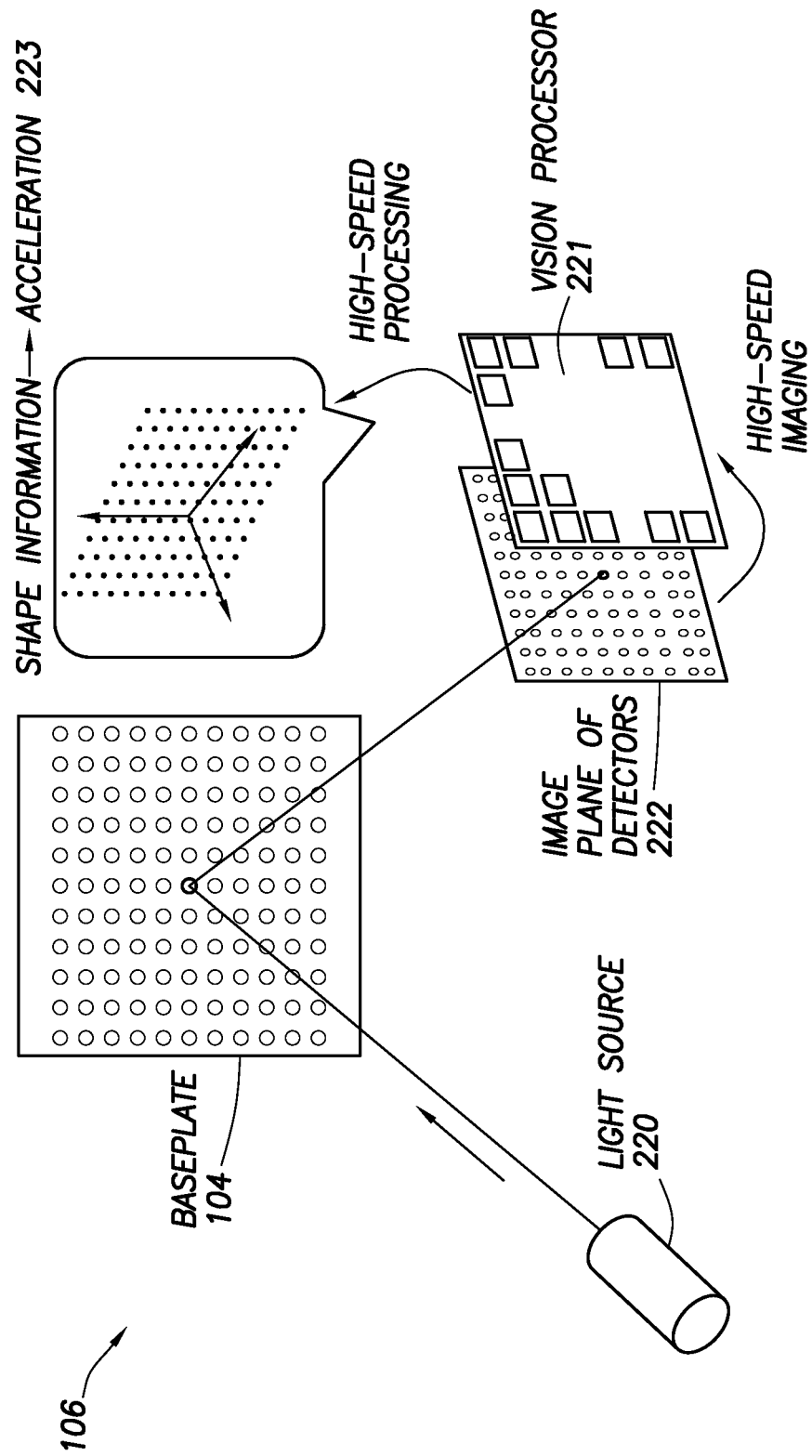
Figures 1, 3:
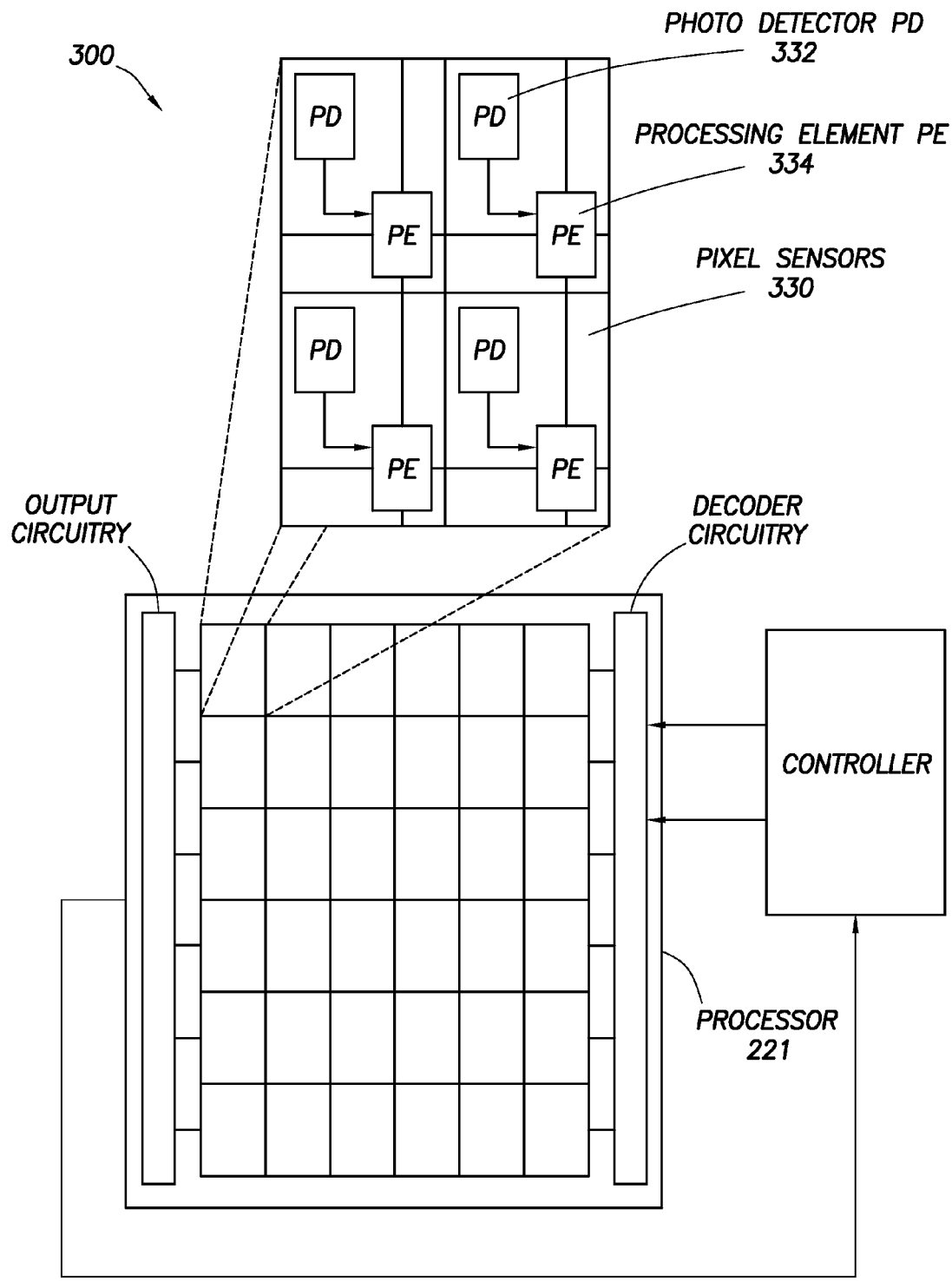
Figures 2, 3:
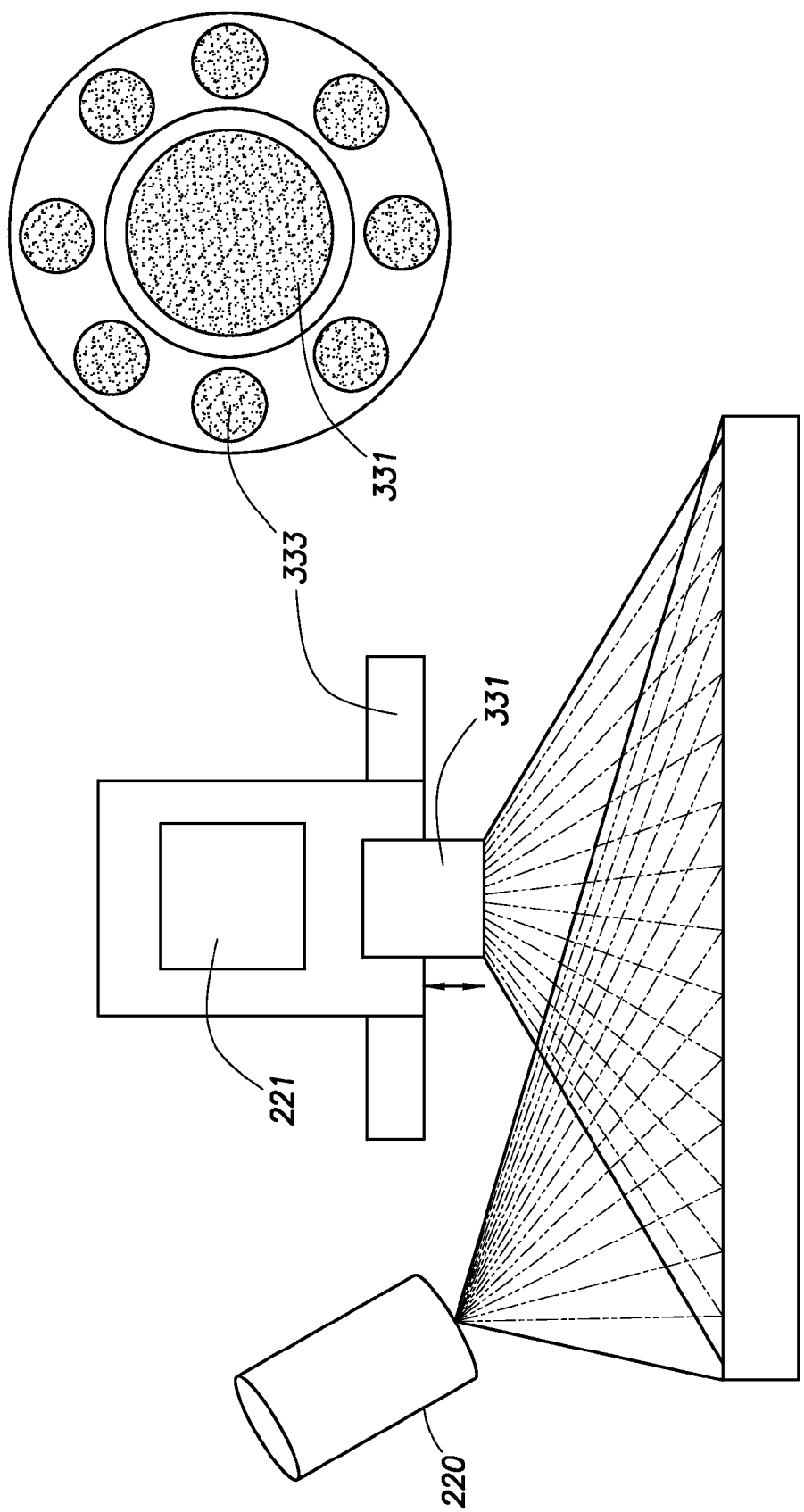
Figure 3:
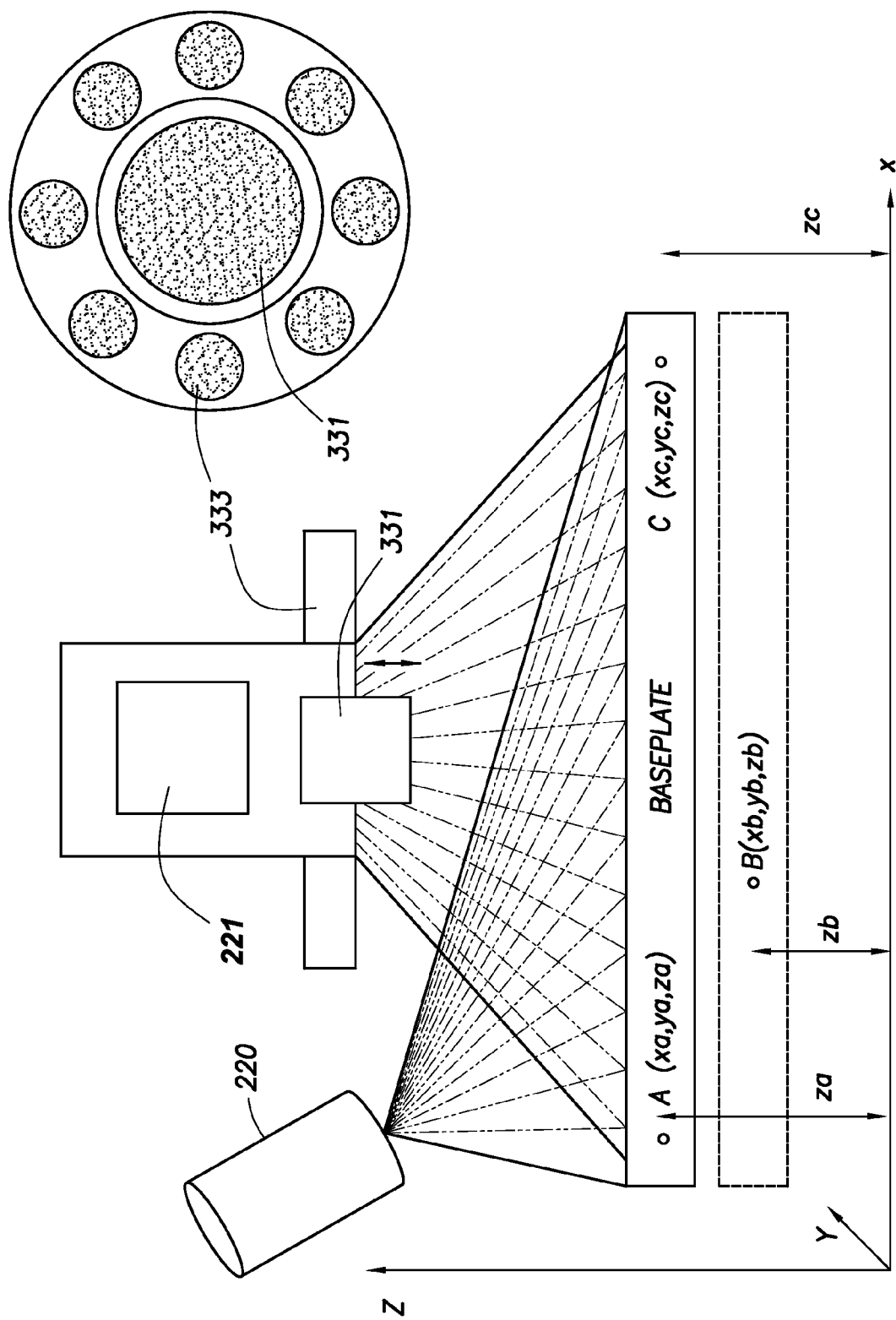
Figure 4:
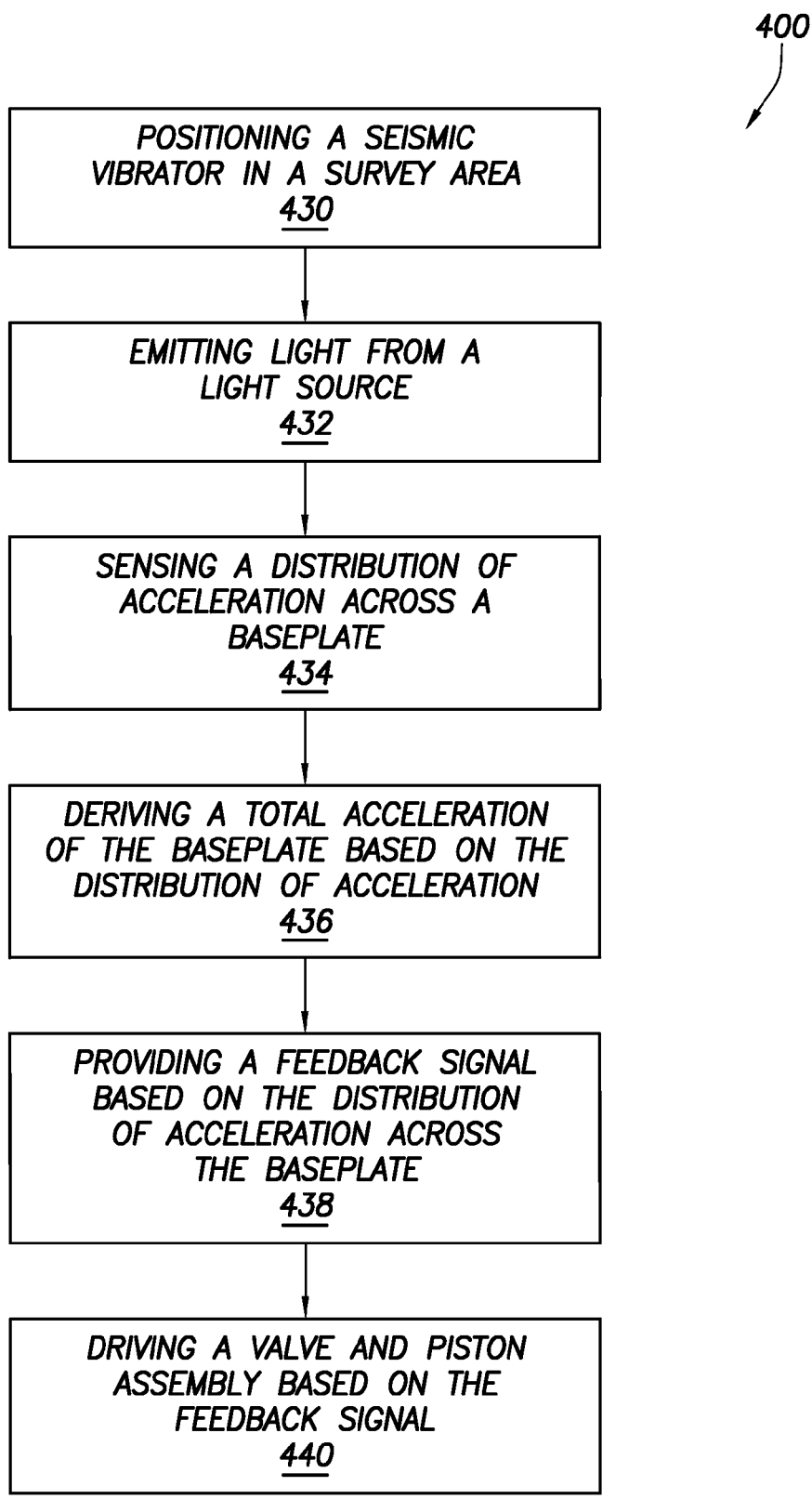

FIG. 5 is a flowchart of a method 500 for automated positioning of a vibrator baseplate 104 (such as that shown in FIGS. 1 and 2) by processing of an optical image in an embodiment of the present disclosure. The method 500 can begin with determining 550 a local area of the ground surface that is most likely to result in good coupling with a vibrator baseplate 104 via a plurality of measurements made with an array of high-speed image units 106. The method 500 continues with positioning 552 the vibrator such that the baseplate 104 is positioned in the local area determined most likely to result in good coupling (so as to avoid poor coupling areas). Examples of local areas with poor coupling may include: uneven ground contour, unstable soil or earth conditions, protruding object such as rock or shrub. Using high-speed imaging units 106 to illuminate the ground surface, examples of local areas with good coupling may include: flat ground contour, stable soil or earth conditions. Differences between good coupling and poor coupling areas can be detected by changes in color and/or texture (from sand to rock, from sand to shrub), or changes in position (from flat contour to uneven contour, or protrusions from the ground). The method 500 continues with using 554 the vibrator to inject sweep(s) into the ground.

FIG. 6 is a flowchart of a method 600 for image recording and vibrator positioning for processing in an embodiment of the present disclosure. In such an embodiment, the images may be used to determine the nature of the surface (for example, level of compaction) for use in processing, such as source signature deconvolution. For example, the high-speed imaging system measures the surface source signature ("SSS") at a vibrator's baseplate. In Vertical Seismic Profile (VSP) surveys, the borehole receivers record the far-field source signature ("FSS") as direct arrivals, as well as the later in time reflection arrivals. In a Case A, the SSS is constant, and the FSS is constant, representing a static survey, where the vibrator is stationary and performing repeated, consistent sweeps. In a Case B, the SSS is constant, but the FSS is changing with the formation characteristics, representing a primary service measure of changes in formation characteristics as the vibrator baseplate moves to a new position. In a Case C, the SSS is changing, and the FSS is also changing, indicating the primary service is compromised. In Case C, however, provided the SSS is measured accurately, which the high-speed imaging systems of the present disclosure do, then small changes in SSS can be compensated for and the corrected FSS can be used to determine the changes in formation characteristics.

The method 600 begins with determining 660 a local area of the ground surface that is most likely to result in good coupling with a vibrator's baseplate 104 via one or more measurements made with high-speed image unit(s) 106. The method 600 continues with positioning 662 the vibrator such that the baseplate 104 is positioned in the local area determined most likely to result in good coupling. The method 600 continues with recording 664 images of the surface. The method 600 continues with using 666 the vibrator to inject sweep(s) into the ground. As before, differences between good coupling and poor coupling areas may be detected by changes in color and/or texture (from sand to rock, from sand to shrub), or changes in position (from flat contour to uneven contour, or protrusions from the ground). Due to the weight pressed on the ground from the baseplate 104, and the energy imparted into the ground from sweep(s), the ground conditions may change as a result (e.g., in soft sand the sand could flow, in soft terrains the surface could become compacted, in urban areas the road surface may be damaged). To measure these changes in ground conditions, the method 600 continues with recording 668 images of the surface after the sweep(s). The method 600 continues with processing 670 the images to determine characteristics of the ground in the near-surface range.

Figure 7:
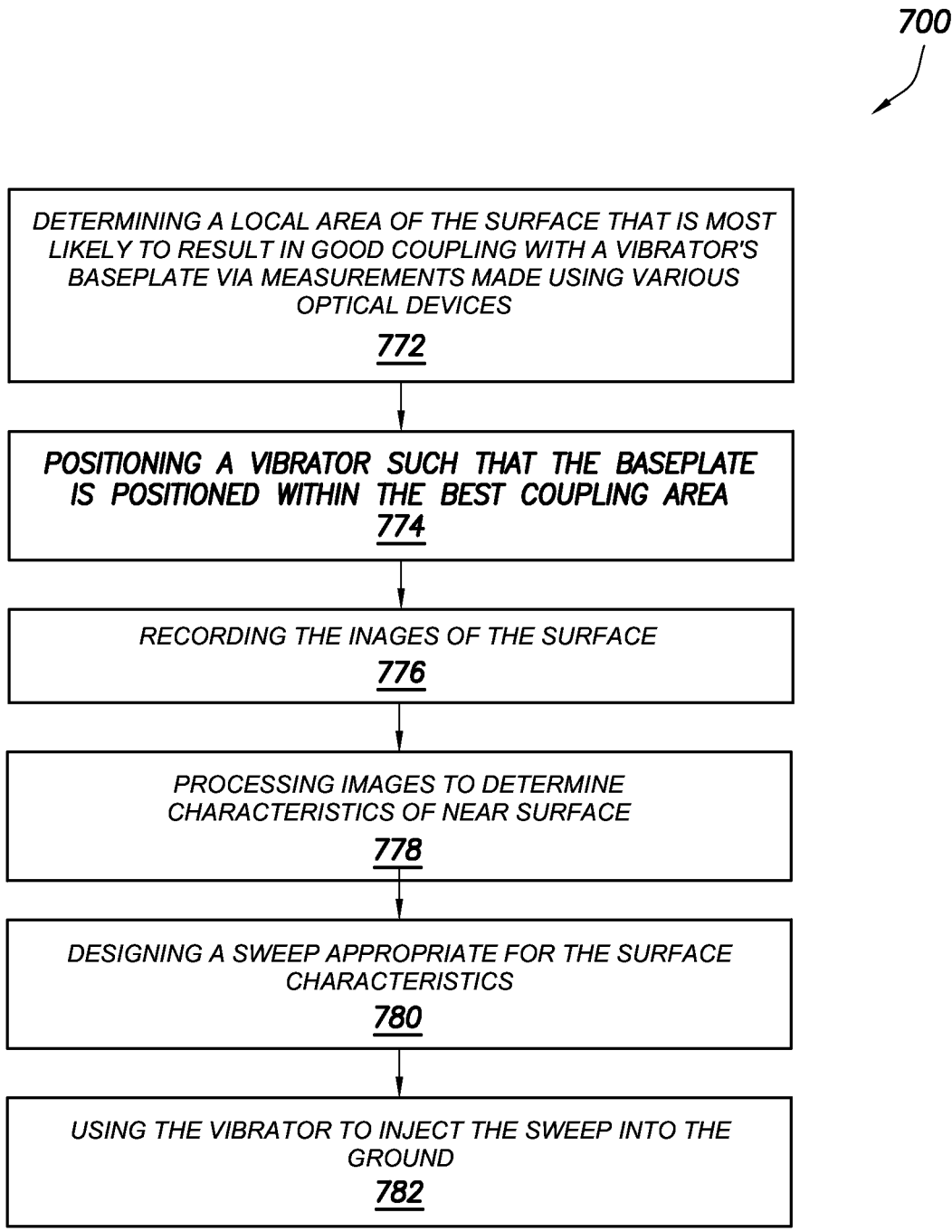
FIG. 7 is a flowchart of a method for processing the images from the high-speed image devices to determine the nature of the ground surface in a survey area, in an embodiment of the present disclosure.

FIG. 7 is a flowchart of a method 700 for processing images obtained with high-speed image devices to determine the nature of the ground surface in a survey area in an embodiment of the present disclosure. For example, the method may determine the nature of the surface, as to whether sand or gravel, ice, brushy, etc. The sweep emitted at any given position may be tailored to produce an optimized signal for the position by allowing for specific coupling conditions for the surface type. In an embodiment, adjusting for specific coupling conditions for surface type could include updating vibrator parameters such as drive level and/or changing the sweep parameters.

With a conventional vibrator control system, the baseplate acceleration would be measured at a single point, the point where the analog acceleration sensor is physically fixed to the top surface of the baseplate. Because the baseplate acceleration is measured at one point in a conventional control system, the vibrator's parameter of drive level (force output setting) may be a fixed value for the duration of the survey. This is acceptable if the surface ground conditions are consistent throughout the survey. However if the surface ground conditions change, as conditions tend to do over real surveys, the fixed drive level may be too high if the vibrator encounters poor ground conditions, leading to high distortion in the vibroseis energy imparted into the ground, or damage imparted to paved roads in urban areas. On the other hand, if the vibrator encounters better surface ground conditions the opportunity is lost to impart higher vibroseis energy into the ground. The high-speed imaging systems of the present disclosure derive multiple accelerations of the baseplate over a large area of the baseplate illuminated by high-speed imaging unit(s), providing a more accurate measure of the vibrator's actual force output and harmonic distortion, therefore the vibrator's parameter for drive level (force output setting) can be optimized for changing ground conditions during the survey. The vibrator's imaging system can automatically adjust the drive level in the vibrator controller, or advise the operator to adjust the drive level to an optimum level (down for lower drive level in poor ground conditions, or up for higher drive level in good ground conditions).

The method 700 begins with determining 772 a local area of the ground surface that is most likely to result in good coupling with a vibrator's baseplate 104 via one or more measurements made with high-speed image unit(s) 106. The method 700 continues with positioning 774 the vibrator such that the baseplate 104 is positioned in the local area determined most likely to result in good coupling. The method 700 continues with recording 776 images of the surface. The method 700 continues with processing 778 the images to determine characteristics of the ground in the near-surface compaction range. The method 700 continues with designing 780 a sweep tailored to the characteristics of the near ground surface. The method 700 continues with using 782 the vibrator to inject into the ground the sweep tailored to the surface characteristics.

Generally, the signal-to-ambient-noise ratio (SANR) of vibroseis is related to the output force of the vibrator, multiplied by the square root of the product of the sweep length and the number of sweeps. In general, it may be more efficient to increase SANR by increasing the force output rather than increasing the sweep length or the number of sweeps (which adds to the survey duration), but safety concerns and the surrounding environment may preclude operations at high force levels. One example is a seismic survey in urban area—a high force level that would be acceptable in open fields, but that would cause damage to paved roads would be unsuitable in an urban area:

$$SANR \sim N_V \times F_{FUND}(T_S \times N_S)^{1/2} \qquad \text{eq. 3}$$

where SANR=Signal-to-Ambient-Noise Ratio, $N_V$=Number of Vibrators, $F_{FUND}$=Fundamental Force (vibrator force output), $T_S$=Time of Sweep (length), and $N_S$=Number of Sweeps.

With the presently disclosed systems, using high-speed imaging units 106 to illuminate the ground surface, changes in ground surface may be sensed when the vibroseis is approaching pavement (changes in, e.g., surface texture, color, and contour) indicating a potential damage situation. The vibrator controller 110 can then reduce the drive level (or advise the operator to reduce the drive level), which in turn reduces the force output, preventing damage to the road surface. The reduction in output force can be compensated by the vibrator controller 110 changing the sweep parameters to longer sweep lengths to achieve an acceptable SANR.

Figure 8:
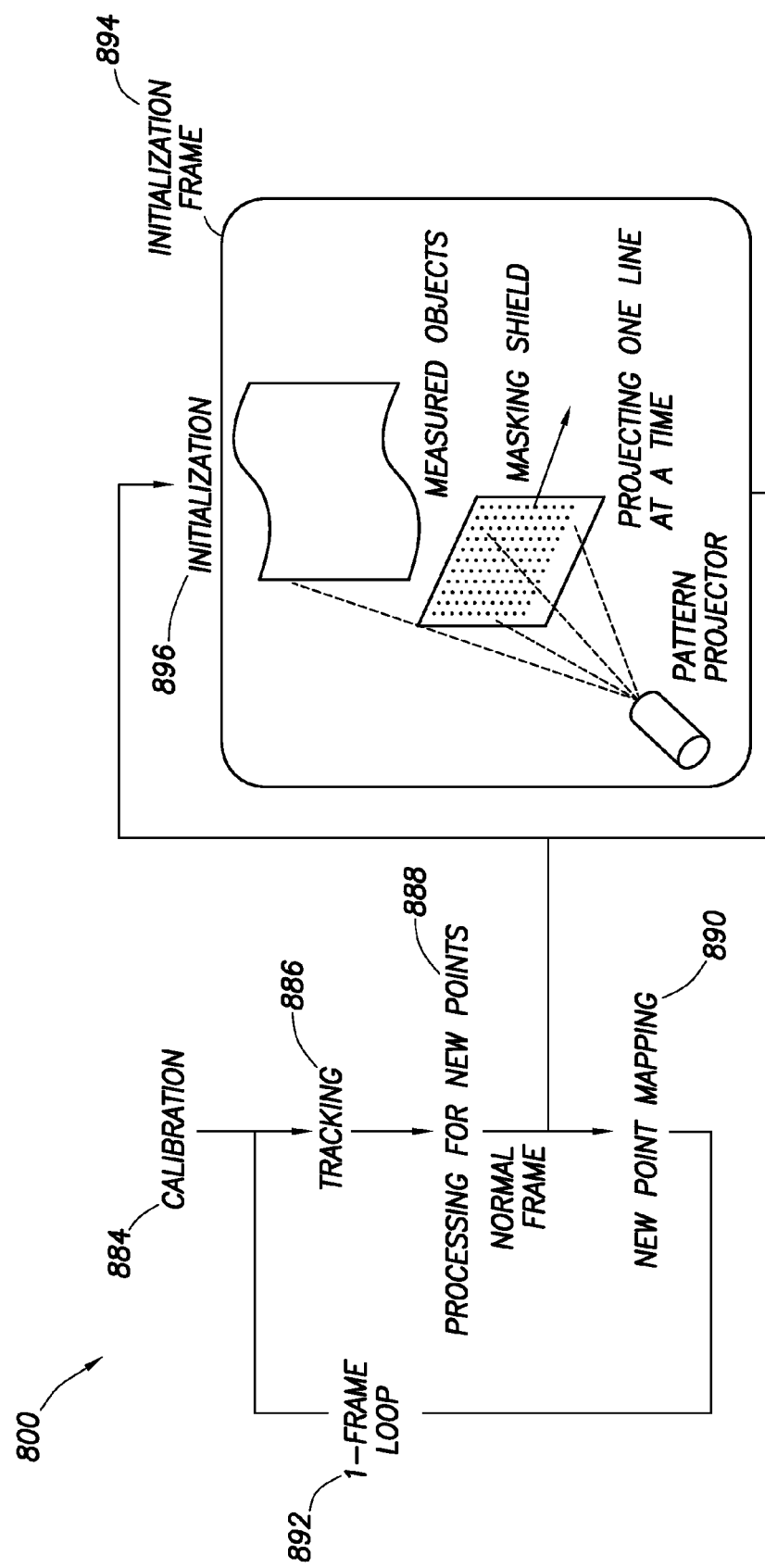
FIG. 8 is a flowchart of a method for a high-speed imaging method that can be applied to a vibrator control system, in an embodiment of the present disclosure.

FIG. 8 is a flowchart of a method 800 for a high-speed image processing method that can be applied to a vibrator control system, in an embodiment of the present disclosure. For an example of real-time shape measurement using high-speed vision, see "955-fps Real-time Shape Measurement of a Moving/Deforming Object using High-speed Vision for Numerous-point Analysis", Watanabe, et al., 2007 IEEE International Conference on Robotics and Automation, Roma, Italy, 10-14 Apr. 2007, which is hereby incorporated by reference in its entirety.

In block 884 for calibration, a geometrical relationship between the location of the high-speed image unit(s) and an area of the baseplate included in the projection of the high-speed image unit(s) can be established. In an embodiment, this may be performed by determining three functions as a function of time t:

$$[x_w, y_w, z_w]^t = [f_1^i(z_w), f_2^i(z_w), f_3^i(X_v)]^t \qquad \text{eq. 4}$$

from three known pairs of three-dimensional points $M_i$ and image points $m_i$ of each projected spot i without obtaining intrinsic parameters c, $s_i$, and P. The functions $f_1^i$ and $f_2^i$ determine the $x_w$ and $y_w$ coordinates of the three-dimensional point for spot i from the depth distance, that is the $z_w$ coordinate. The relationships are expressed as linear function:

$$f_j^i(z_w) = \alpha_{j,1}^{(i)} z_w + \alpha_{j,0}^{(i)} (j=1,2) \qquad \text{eq. 5}$$

The function $f_3^i$ determines the depth distance $z_w$ from the $X_v$ coordinate of an image point. This function may be expressed as a hyperbola about $X_v$ and $Y_v$. However, over a small range, this function can be approximated by a polynomial expression:

$$f_3^i(X_v) = \Sigma_{k=1}^n \alpha_{3,k}^{(i)} X_v^k \qquad \text{eq. 6}$$

In an embodiment, a second-order polynomial approximation may be employed. The above functions may be determined by obtaining multiple spot patterns to $x_w y_w$ planes at known different distances $z_w$.

In decision block 888 for processing new points, a determination is made, as to whether the frame is a normal frame or an initialization frame. The frame is an initialization frame at the start of the measurement when there is no prior frame to compare to, while a frame is a normal frame when there is a previous frame to match to, as will be discussed further below.

For an initialization frame 894, in block 896 for initialization the following occurs. The processor uses a mapping of which image point source corresponds to each projected spot. Thus, the processor uses the information of the previous frame at the high-frame-rate imaging and achieves the matching between the image point sources and the projected spots. The tracking-based method may make a dynamic modification of the search area according to pattern changes. Initialization involves controlling a start time t(i) of projecting about each spot i as follows:

$$t(i) = T_\delta (i \in A_\delta = 1, \ldots, N_e) \qquad \text{eq. 7}$$

where $A_\delta$ is a class of projected spots, whose epipolar lines $l_i(Y_v = l_i(X_v))$ constraining movement of spot i in image space don't intercross, T is time, and where $N_e$ is the number of divided classes. As shown in FIG. 8, in the initialization 896, a masking shield (such as described in U.S. Pat. No. 7,945,873) is disposed between the projector and the measured object (here, the baseplate). The masking shield projects a pattern into the space, thereby dividing the surface of the measured object into a plurality of grid cells. The pattern projector (light source 220) projects a line at a time, using the masking shield, and when geometric information about a projected line is known (in latter steps), the three dimensional point $M_i = [x_w, y_w, z_w]^t$ can be obtained from the image point $M_i = [X_v, Y_v]^t$. An expression for a projected line is represented by:

$$M_i = c + \delta s_i (i=1, \ldots, N_p) \qquad \text{eq. 8}$$

where $s_i$ represents the gradient, c is the relative center position of the projector, and i is the relative position of the measured spot, $N_p$ representing the total number of spots. Each measured spot lies on an intersection of two lines, the projection line represented by eq. 8, and a vision constraining line, expressed by:

$$P\tilde{M} = w\tilde{m}_l \qquad \text{eq. 9}$$

where $\tilde{m}_l = [m_i^t, 1]^t$ of spot i and a three-dimensional point $\tilde{M}_l$ obtained from eq. 8 and 9, based on observed image points, connected by a perspective projection matrix P. In making the measurement for each point, c, $s_i$, and P may be known parameters, and $\tilde{m}_l$ is observed data.

For a normal frame, in block 886 for tracking, the following occurs. When the frame rate is relatively high compared to changes in the measured phenomena, it can be assumed that the difference between spots projected on a smooth surface between successive frames is small. Using this assumption, the operation for corresponding an image point to a spot i could be expressed as a tracking operation between frames, in which a point $m_i(t-1)$ corresponding to a point m(t) is searched for using corrected points at time t−1 based on the evaluation:

$$\{|m_i(t-1)-m(t)|+|M_i(t-1)\tilde{M}(t)|\} \qquad \text{eq. 10}$$

Such searching of neighbor points in two-dimensional image space can be performed using the bucket method, which can perform the search operation of the nearest point to an input point by dividing the search space into grids and accessing neighbor areas, instead of accessing the points of the whole search space. This makes the number of calculations per linear with respect to the number of measured image points to be corresponded, so long as the set of points is distributed equally, which results in an equal number of points included within each grid.

For a normal frame (when there is a previous frame for comparison), in block 890 for new point mapping, the following occurs. There are points that move discontinuously because they are on points of contact between the measured object (here, the baseplate) and a projected line of the spot. These points are mapped by using the epipolar line. This search operation is based on the evaluation:

$$\min\{|Y_v(t)-l_i(X_V(t))|\} \qquad \text{eq. 11}$$

The relative number of these discontinuously moving points can be assumed to be small, and this operation does not cause a problem in terms of processing time. Constraints may be defined for the speed at which these points jump in the depth direction between frames in order to avoid the overlapping of spots in image space.

Then, for a normal frame in 1-frame loop 892, the next frame is considered, until each frame has been processed as described herein.

Figure 9:
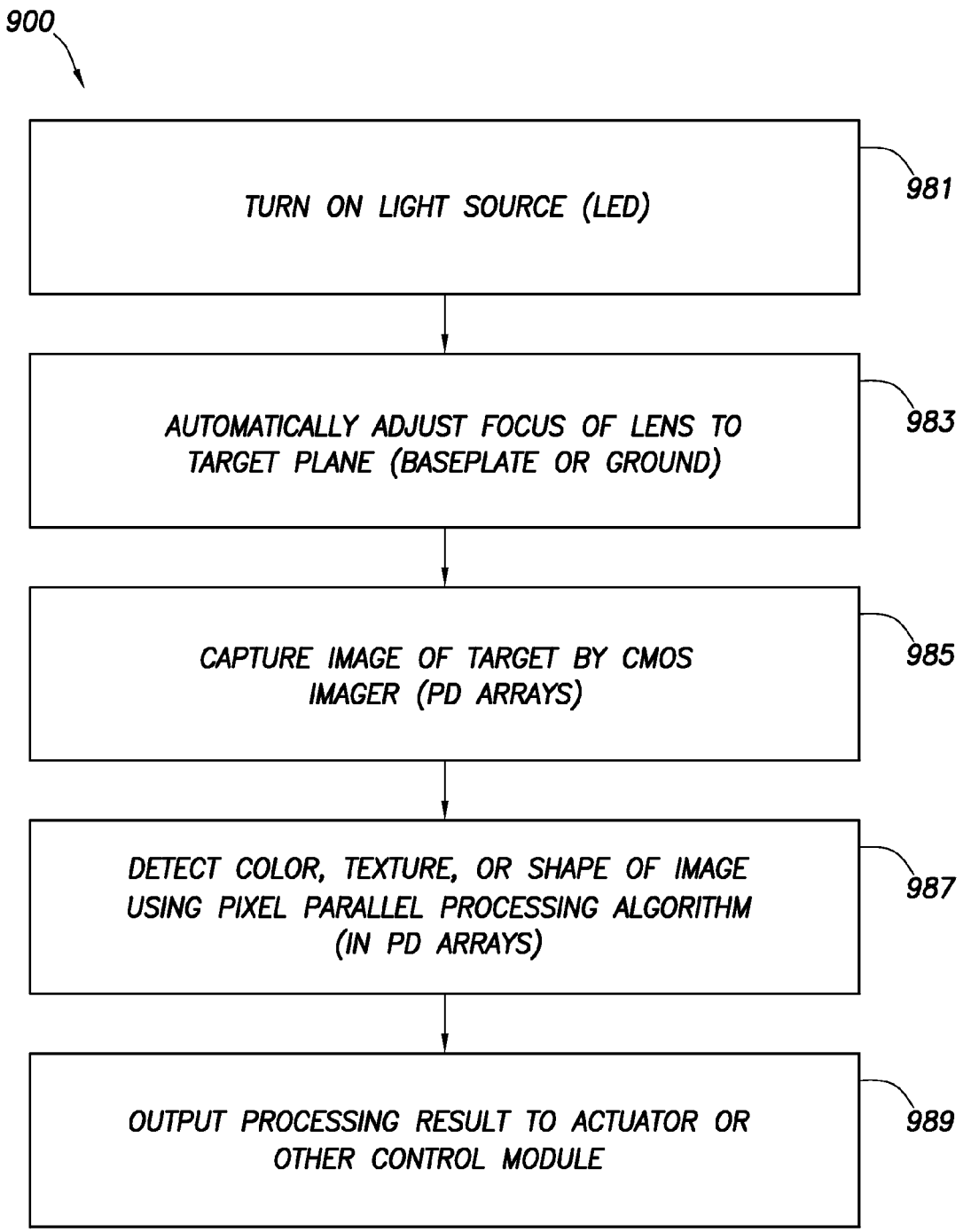
FIG. 9 is a flowchart of a method for a high-speed imaging method that can be applied to a vibrator control system to obtain a two-dimensional image indicative of color, texture, etc., in an embedment of the present disclosure.

FIG. 9 is a flowchart of a method 900 for a high-speed imaging method that can be applied to a vibrator control system to obtain a two-dimensional image indicative of color, texture, etc., in an embodiment of the present disclosure. The method 900 begins with turning on 981 a light source 220. The method 900 continues with automatically adjusting 983 the focus of a lens 331 to a target plane of measurement (e.g., either a baseplate or the ground specifically). The method 900 continues with capturing 985 an image of the target by high-speed image unit(s) 106. At 987, the method 900 continues with detecting a property, such as color, texture, or shape, of the image using a pixel parallel processing algorithm, such as that described above with respect to FIG. 2 and FIG. 8. The method 900 proceeds with outputting 989 the processing result (i.e., the detected property) to an actuator or other control module (e.g., to adjust the vibrator for optimized coupling).

Figure 10:
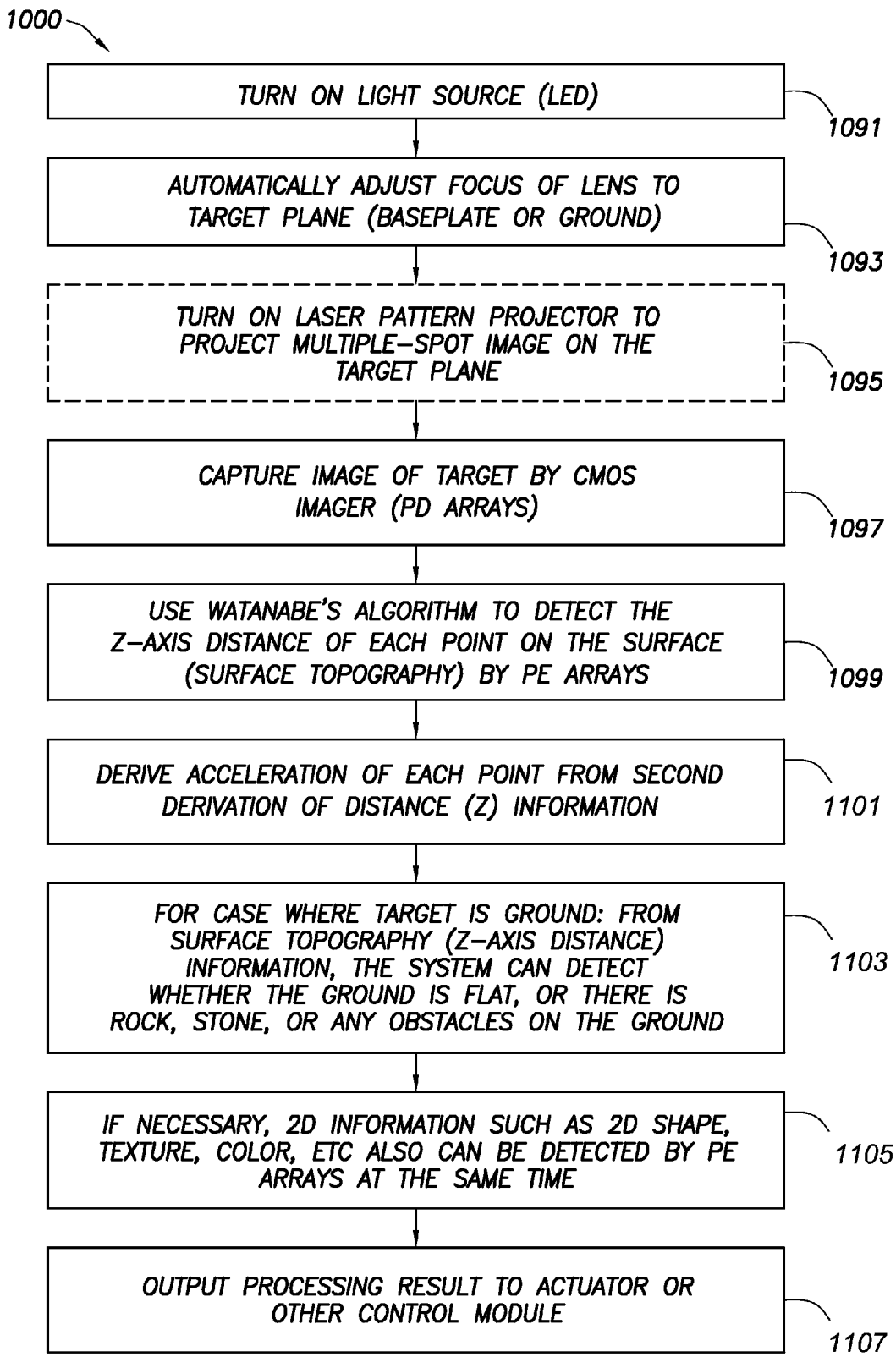
FIG. 10 is a flowchart of a method for a high-speed imaging method that can be applied to a vibrator control system to obtain a three-dimensional image indicative of distance to target, in an embedment of the present disclosure.

FIG. 10 is a flowchart of a method 1000 for a high-speed imaging method that can be applied to a vibrator control system to obtain a three-dimensional image indicative of distance to target, in an embedment of the present disclosure. The method 1000 begins with turning on 1091 a light source 220. The method 1000 continues with automatically adjusting 1093 the focus of a lens 331 to a target plane of measurement (e.g., either a baseplate or the ground specifically). The method 1000 proceeds with turning on 1095 a laser pattern projector to project a multiple spot image on the target plane (either the baseplate or the ground).

The method 1000 proceeds with capturing 1097 an image of the target with high-speed image unit(s) 106. At 1099, the method 1000 proceeds with detecting a z-axis distance of each point on the surface (i.e., a surface topography) using an array or arrays of high-speed image unit(s) 106. The detecting of 1099 may be performed using, for example, the algorithm described above with respect to FIG. 8.

The method 1000 continues with deriving 1101 acceleration for each point based on a second derivative of the distance (z) information. In the case when the target is the ground, the method 1000 proceeds with detecting 1103 whether the ground is flat, the make-up of the surface (e.g., whether stones, rocks, any obstacles). The method 1000 proceeds optionally with detecting 1105 any two-dimensional information (e.g., shape, texture, color, etc.) using the array(s) of high-speed image unit(s) 106. The method 1000 proceeds with outputting 1107 the processing result (e.g., the detected surface mark-up or two-dimensional information) to an actuator or other control module (e.g., to adjust the vibrator for optimized coupling).

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

The invention claimed is:

1. A system for high-speed image monitoring of baseplate movement in a vibrator, comprising:
   an area defined on a baseplate wherein the baseplate is configured to direct a seismic force into a ground surface;
   an actuator assembly configured to generate the seismic force at the baseplate;
   a high-speed image unit positioned to detect at least a portion of the area of the baseplate, comprising:
      a photo detector to sense a light that has come in contact with the portion of the area of the baseplate; and
      a light source to emit the light to be sensed by the photo detector; and
   a controller coupled to the actuator assembly and configured to drive the actuator assembly;
   wherein the sensed light by the photo detector is used to determine acceleration of the portion of the area of the baseplate and the acceleration is used to adjust the driving of the actuator by the controller.

2. The system according to claim 1, wherein the light source of the high-speed image units comprises a laser diode.

3. The system according to claim 1 wherein the image unit further comprises a processing element to determine image data from the sensed light, wherein the image data is used to calculate acceleration.

4. The system according to claim 3 wherein the image data is position.

5. The system according to claim 3 wherein the processing element is a high-speed image processor.

6. The system according to claim 1 wherein the high-speed image unit further includes an array of photo detectors.

7. The system according to claim 1 wherein the light source comprises a multi-spot pattern projector.

8. A sensor for high-speed image monitoring of baseplate movement in a vibrator, comprising:
- a light source configured to emit light directly upon at least a portion of a top area of a baseplate;
- a photo detector located above the baseplate to detect the light reflected from contacting at least the portion of the top area of the baseplate, the photo detector configured to measure the detected light that has contacted the portion of the top area of the baseplate; and
- a high-speed image processor coupled to the photo detector to determine a distribution of acceleration across the portion of the top area of the baseplate based on the measured sensed light detected by the photo detector.

9. The sensor according to claim 8, wherein the light source comprises a laser diode.

10. The sensor according to claim 8, wherein the light source comprises a multi-spot pattern projector.

11. A method for high-speed image monitoring of baseplate movement in a vibrator, comprising:
- operating a seismic vibrator in a survey area, the seismic vibrator comprising:
  - an area defined on a baseplate wherein the baseplate is configured to direct a seismic force into a ground surface;
  - an actuator assembly configured to generate the seismic force at the baseplate;
  - a high-speed image unit positioned to detect at least a portion of the area of the baseplate, comprising:
    - a photo detector configured to sense light that has come in contact with the portion of the area of the baseplate; and
    - a light source configured to emit the light to be sensed by the photo detector; and
  - a controller coupled to the actuator assembly and driving the actuator assembly;
- emitting the light across the portion of the area of the baseplate; and
- sensing the light that has come in contact with the portion of the area of the baseplate;
- determining a distribution of acceleration across the portion of the area of the baseplate based upon the sensed light; and
- adjusting the driving of the actuator assembly based upon the determined distribution of acceleration.

12. The method according to claim 11, further comprising deriving a total acceleration of the area of the baseplate based on the distribution of acceleration.

13. The method according to claim 11 wherein the image unit further comprises a processing element to determine image data from the sensed light, wherein the image data is used to calculate acceleration.

14. The method according to claim 13 wherein the image data is position.

15. The method according to claim 13 wherein the processing element is a high-speed image processor.

16. The method according to claim 11 wherein the light source is a laser diode.

17. The method according to claim 11 wherein the light source is a multi-spot pattern projector.

18. A survey method, comprising:
- positioning a seismic vibrator in a survey area, the seismic vibrator comprising a baseplate defined by an area, disposable at a ground surface configured to direct a seismic force into the ground surface;
  - a reaction mass coupled to and positioned above the baseplate configured to generate the seismic force at the baseplate;
  - an actuator assembly coupled to the reaction mass configured to vibrate the reaction mass;
  - one or more high-speed image units directed at the area of the baseplate, comprising:
    - a plurality of photo detectors configured to sense a distribution of acceleration across the area of the baseplate; and
    - a light source configured to emit light to be sensed by the plurality of photo detectors; and
  - a controller coupled to the actuator assembly, the controller configured to drive the actuator assembly;
- obtaining a plurality of measurements indicative of seismic vibrator baseplate-earth coupling in the survey area;
- determining an optimal coupling location based on the plurality of measurements indicative of seismic vibrator baseplate-earth coupling in the survey area;
- positioning the seismic vibrator in the optimal coupling location; and
- applying a seismic sweep into the survey area using the seismic vibrator.

19. The method according to claim 11 wherein the high-speed image unit further includes an array of photo detectors.

20. The method according to claim 19 wherein the array of photo detectors further includes a corresponding array of processing elements to determine image data from the sensed light, wherein the image data is used to calculate acceleration.

* * * * *